United States Patent Office 3,226,237
Patented Dec. 28, 1965

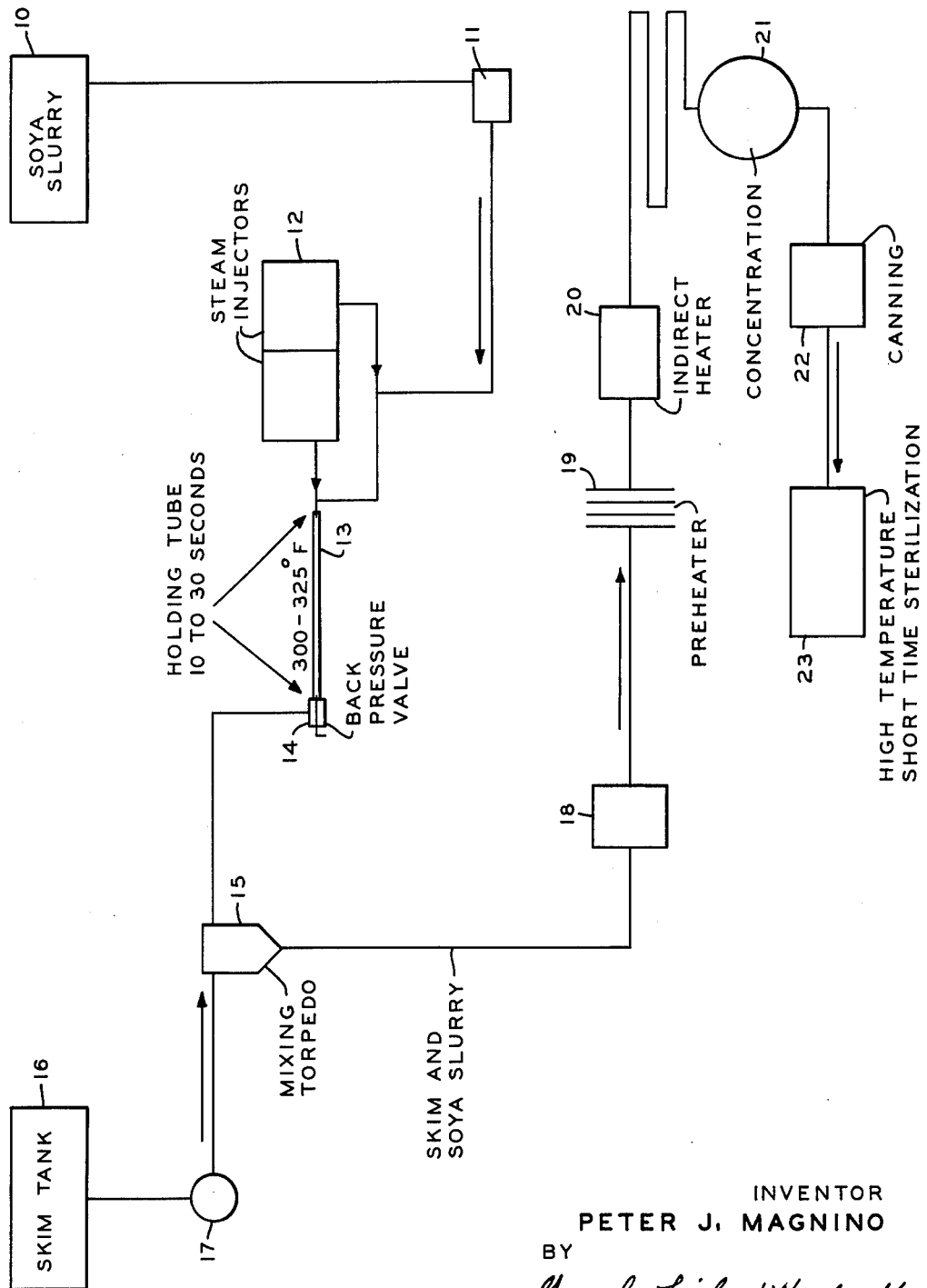

3,226,237
FOOD HEAT TREATMENT PROCESS
Peter J. Magnino, Madison, Wis., assignor to Pet Milk Company, St. Louis, Mo., a corporation of Delaware
Filed July 23, 1962, Ser. No. 211,718
9 Claims. (Cl. 99—215)

The present invention relates to an improved process for the pre-treatment of dry food products high in spore forming organisms, particularly soya flour and cocoa.

In the manufacture of products which contain soya flour, difficulties are incurred in obtaining a sterilized finished product due to the heat resistance of the spores present in the soya flour. This necessitates very high sterilization temperatures which present a stability problem and often produce off-flavors. The present invention lowers the total thermophilic count of a soya flour and cocoa slurry to below the standards set by the National Canners Association for sugar. This is accomplished before the forewarming and condensing operations thereby making it possible to retort sterilize the final food product (often containing a milk product) at a lower temperature.

Heretofore, soya and milk or cocoa and milk products had a coagulation and viscosity problem because of the high phosphorus-calcium ratio in soya flour and in cocoa. A source of calcium, such as calcium chloride had to be added to the product to prevent coagulation. Even so, the viscosity of the final product often was high. Also, the amount of calcium added was critical and difficult to determine. The present invention obviates the necessity for adding calcium to the system, and still provides a stable low viscosity product.

One of the principal objects of the present invention is to destroy a large percentage of the spore forming organisms present in the soya flour and/or cocoa before it is mixed with the milk supply before forewarming.

Another object of this invention is to disperse the soya flour and/or cocoa in a water suspension by subjecting it to a very high temperature of about 300° F.–325° F., and to rapidly cool said hot slurry by intermixing with a second fluid food product to effect an intimate mixing and provide a complete stable suspension of the soya flour in the second fluid.

A further objective of this invention is to incorporate a heated soya solution with a cold milk supply in such a manner as to raise the temperature of the milk prior to forewarming and sterilization of the milk.

Still another objective of this invention is to produce a lower retort sterilization of the final product by destroying a large percentage of organisms before filling and also gain an easier destruction of these organisms by producing a better suspension of particles.

Still another objective of this invention is to produce a product with better heat stability, when subjected to retort sterilization of high temperatures.

Still another object of the present invention is to provide a method of making a final product which includes a first ingredient having a high phophorus-calcium ratio and a second ingredient having a low phosphorus-calcium ratio without the necessity for adding calcium to prevent coagulation during sterilization.

Still another object of the present invention is to provide a milk and soya product having a thin viscosity and which does not coagulate during sterilization of the milk.

Yet another object is to provide a method for sterilizing soya flour (i.e., reducing the spore count to less than 1 spore/gm. solids) which eliminates the necessity for precooking of the soya before sterilization, the precooking heretofore having been necessary to release the protein and make it nutritionally available.

These and other objects and advantages will become apparent hereinafter.

The present invention includes the process of reducing the spore count to less than 1 spore/gm. solids of a dry food product in slurry form, particularly soya flour and cocoa slurry, said food product being high in spore forming organisms and being treated at a predetermined high temperature above about 300° F., prior to mixing a minor portion of the slurry with a major portion of a fluid food product, preferably a milk product, and heating the slurry and the fluid food product to a lower temperature to sterilize the fluid food product. The present invention also includes a process for combining milk with ingredients having high phosporus-calcium ratio without the addition of calcium providing salts while still obtaining low viscosities of the final product. The present invention further comprises the process hereinafter described and claimed and in the food product produced by said process.

The drawing shows a schematic flow diagram of the present process.

EXAMPLE NO. 1

The dry food product, specifically soya flour and/or cocoa is slurried with hot water (180° F.), hereinafter called slurry, by use of a conventional funnel and water injection system, into approximately a 10% solution in a holding tank 10.

The soya flour may be suspended in hot water for 4–6 hours at 160–200° F., or it may be formed into a cold water slurry and directly fed into the sterilization apparatus, depending on the equipment available.

The soya slurry is pumped from the tank 10 by a positive pump 11 through a heating unit 12 which may be either steam injection torpedos or an indirect heater, where it reaches a temperature of 320° F. The soya slurry is pumped at the rate of about 5000#/hr. The slurry is held for 16 seconds in a holding tube 13 and is controlled under pressure gained by use of a back pressure valve 14. The hot slurry is then incorporated with the milk supply in a six inch mixing torpedo thereby increasing the temperature of the mixture to the pan to approximately 80° F.

The milk supply is an aqueous slurry of milk solids, preferably skim milk, and is held at about 40° F. in a holding tank 16. A centrifugal pump 17 supplies milk from the tank 16 to the mixing torpedo 15 at the rate of about 24,000#/hr.

The milk and soya slurry product pass from the mixing torpedo 15 at a temperature of about 80° F. and at a rate of about 29,000#/hr. to a positive displacement pump 18. The pump 18 supplies the product to a preheater 19 where it is warmed to 180° F.

From the preheater 19, the milk and soya slurry product go to an indirect heater 20, where the milk is heated to a temperature of about 245–255° F.

The milk and soya product is passed from the apparatus 20 to a double effect vacuum pan 21 where a desired amount of water is removed from the product.

The concentrated product from the vacuum pan 21 is placed in cans in a canning machine 22 and is then subjected to a high temperature-short time sterilization procedure in the sterilizer 23. The high temperature-short time sterilization procedures and equipment are well known in the art.

The final product is useful as a diet food, and the present process is useful in producing infant foods or formulas and in producing allergic goods incorporating soya flour therein.

The fluid in the storage tank 16 can be any suitable fluid food product and need not be a milk product. In fact, when using the present process for allergic infant formula, the fluid product would not be milk, but would contain some vegetable fat.

The rapid mixing of the hot slurry with the cool fluid food product which occurs in the mixer 15, causes the rapid cooling of the soya slurry with a flashing or explosive effect which intimately mixes the very insoluble particles of soya flour in the fluid food product. The soya flour particles are placed in a stable suspension by the violent mixing. If the soya slurry is cooled before mixing with the fluid food product, the mixing is not so complete and such a stable suspension is not formed.

The temperature of the slurry during treatment to destroy a large percentage of the spore forming organisms, the length of the slurry holding time and the percentage of soya and/or cocoa in solution are very important.

A low temperature, below 300° F., will not produce the desired kill for spore forming organisms present while a very high temperature, above 325° F., will produce undesirable cooked or scorched flavors in the finished product. This also applies to the holding time of the heated slurry where a short holding time, below 10 seconds, will not provide adequate kill while a hold of over 30 seconds will again produce off-flavors.

The percentage of soya and/or cocoa in the slurry suspension is critical because any percentage above about 15% will not insure adequate kill of spore forming organisms or dispersion of the soya particles. Thus, the present invention contemplates soya slurry suspension having about 15% or less, preferably about 10%, by weight, of dry ingredients.

The following tables show that the pre-treatment of soya flour and/or cocoa slurry will almost completely destroy the spores present in the dry products. These procedures are carried out in accordance with the method set forth in Example No. 1.

*Chocolate, soya flour slurry*

| Raw Slurry Sample | Total Solids, Percent | Spores/G. Solids |
| --- | --- | --- |
| #1 Tank | 14.9 | 2,545 |
| #2 Tank | 15.8 | 2,375 |
| #3 Tank | 16.3 | 2,570 |

The three tanks of the foregoing slurry were heated by steam injection with a holding time of 16 seconds, and the following samples were taken from the process after treatment during a typical 8 hour cycle. These data show that the treatment effectively kills the bacteria to reduce the spore count to less than 1 spore/gm. solids.

| Time | Temp., °F. | Total Solids, Percent | Spores/G. Solids, g. |
| --- | --- | --- | --- |
| Beginning (about 30 min.) | 310 | 15.3 | <1/1.5 |
| Middle (about 4 hours) | 312 | 14.4 | <1/1.4 |
| End (about 7 hours) | 312 | 14.6 | <1/1.5 |

*Soya flour slurry*

| Raw Slurry Sample | Total Solids, Percent | Spores/G. Solids |
| --- | --- | --- |
| #1 Tank | 9.3 | 1,480 |
| #2 Tank | 8.5 | 1,580 |
| #3 Tank | 10.7 | 1,620 |

The foregoing samples were also steam injected with a holding time of 16 seconds, and the following samples were taken from the process after treatment during a typical 8 hour cycle.

| Time | Temp., °F. | Total Solids, Percent | Spores/G. Solids, g. |
| --- | --- | --- | --- |
| Beginning (about 30 min.) | 314 | 9.4 | <1/1.1 |
| Middle (about 4 hours) | 313 | 9.0 | <1/1.1 |
| End (about 7 hours) | 313 | 9.2 | <1/1.1 |

The following data shows results of dietary food produced with and without heat treatment of the soya flour and cocoa.

*Untreated soya flour and cocoa*

| Flavor | *Oz. CaCl$^2$ Before Forewarmer | Sterilization Temperature °F. | Viscosity (31° C.) cp. |
| --- | --- | --- | --- |
| Chocolate | 4.06 oz./1000# Concentrate | 262 | 30.4 |
| Chocolate | 2.02 oz./1000# Concentrate | 267 | 37.6 |

*Treated soya flour and cocoa*

| Chocolate | None | 266 | 20.4 |
| --- | --- | --- | --- |
| Chocolate | None | 266 | 21.9 |

* CaCl$_2$ or other stabilizing salts gives approximately twice the stabilizing or thinning effect when added before the forewarmer as compared with addition to the finished tank.

The foregoing data show that the present process produces low viscosity product without using stabilizing salts.

To further amplify and illustrate this point, one hundred grams of soya flour contains 244 mg. of calcium and 610 mg. of phosphorous; 100 grams of cocoa contains 160 mg. of calcium and 709 mg. of phosphorous; and 100 gms. of skim milk contains 118 mg. of calcium and 93 mg. of phosphorus. The two major non-milk ingredients thus contain a considerably greater proportion of phosphorus in relation to calcium than milk. When the soya slurry was not preheated, calcium (as $CaCl_2$) was required to prevent coagulation of the mixture of slurry and milk solids during final sterilization. The added calcium served to counteract the calcium-phosphorus imbalance caused by use of the ingredients containing a high proportion of phosphorus.

The addition of calcium balanced the mixture sufficiently to prevent coagulation during sterilization of the milk. However, the amount of calcium required was very critical. Much time and effort was required on each batch of product to determine the optimum amount of calcium to prevent coagulation. Furthermore, the product was often thick and viscous having a viscosity of 40 to 60 centipoise at 86° F. instead of the desired thinner body of 15 to 30 centipoise. The present heat treatment of the slurry mixture which contains the phosphorus-rich ingredients greatly improves the stability of the finished product. The addition and precise adjustment of calcium is no longer required, and the desired thin body in the finished product is consistently attained.

Most milk products require a stabilizing salt to prevent coagulation or produce desired viscosity during sterilization. The present slurry heating process stabilizes the product in such a manner that either 20 to 30 oz. of calcium chloride or disodium phosphate will not influence the viscosity. This was not possible before using the present slurry system.

Another desirable aspect of the present invention is that soya products need a heating or cooking period to make the protein nutritionally available. During the production of some infant formulas and allergic foods, the soya product is precooked before sterilizing. This cooking is often required at the soya flour plant during production. This precooking process is not required for a product produced according to the present invention, since the slurry heating process furnishes ample cooking to release the soya protein.

As outlined previously, the product resulting from this invention has been shown to be easier sterilized, is easier stabilized and, due to better dispersion of the soya flour and/or cocoa in the product, will impart a better flavor and texture to the finished product.

This invention is intended to cover all changes and modifications of the example of the invention herein chosen for purposes of the disclosure, which do not constitute departures from the spirit and scope of the invention.

What is claimed is:

1. A method of preparing a liquid composition including a major proportion of a first fluid food product comprising an aqueous milk solids suspenson and a minor proportion of a second food product high in spore forming organisms, said second food product being selected from the group consisting of soya flour, cocoa, and mixtures thereof, consisting essentially of the steps of slurrying said second food product with water in a concentration of up to 15% by weight of solids, heating said slurry including said second food product to about 300–325° F. for about 10–30 seconds, and rapidly mixing said hot slurry with said first fluid food product to rapidly cool said slurry and to produce an intimately mixed composition having said second food product suspended therein.

2. A method of preparing a liquid composition including a major proportion of milk product and a minor proportion of a second ingredient high in spore forming organisms and having a high phosphorus-calcium ratio without adding additional calcium, said second ingredient being selected from the group consisting of soya flour, cocoa and mixtures thereof, consisting essentially of the steps of forming an aqueous slurry containing not more than 15% by weight of said second ingredient, treating said slurry at a temperature of 300–325° F. to reduce the spore content to less than 1 spore/gm. solids, mixing said milk product and said treated slurry, thereafter sterilizing said milk product in the mixture, and recovering a stable product free of added calcium and which has a viscosity of 15–30 centipoise at 86° F.

3. The method defined in claim 2 wherein the milk product is principally skim milk.

4. A method of processing a dry product high in spore forming organisms and having a high phosphorus-calcium ratio, said product being selected from the group consisting of soya flour, cocoa and mixtures thereof, consisting essentially of the steps of forming an aqueous slurry containing not more than about 15% by weight of said product, heating said slurry to about 300–325° F. for about 10–30 seconds to reduce the spore count to less than 1 spore/gm. solids rapidly mixing said hot slurry with an aqueous slurry of milk solids, cooling said hot slurry to substantially below 300° F., intimately mixing and suspending in said fluid, preheating said mixture to a temperature of about 180° F., heating said mixture to a temperature of 245–255° F., concentrating said mixture, canning said product, subjecting said canned product to high temperature-short time sterilization to produce a product which has a viscosity of about 15–30 centipoise at 86° F.

5. The method defined in claim 4 wherein said milk product is skim milk.

6. A method of preparing a stable fluid food composition without chemical treatment consisting essentially of the steps of heating a slurry containing less than 15% by weight of a food product selected from the group consisting of soya flour, cocoa, and mixtures thereof to a temperature of about 300–325° F. for about 10–30 seconds to reduce the spore count to less than 1 spore/gm. of solids, and rapidly mixing the hot slurry with a fluid food product containing milk solids which is at a lower temperature to rapidly cool the slurry and cause intimate mixing of the slurry food product into the fluid food product in a stable suspension.

7. The method of claim 6 wherein the fluid food product is skim milk.

8. The method of claim 7 wherein the slurry contains about 10% by weight of food product.

9. The method of claim 7 including the steps of treating the mixture of slurry food product and skim milk without addition of stabilizing salts at sterilizing conditions to sterilize the skim milk, and recovering a stable sterile product having a viscosity of about 15–30 centipoise at 86° F.

References Cited by the Examiner
UNITED STATES PATENTS

| | | | |
|---|---|---|---|
| 2,209,202 | 7/1940 | Horne | 99—55 |
| 2,396,265 | 3/1946 | Jackson | 99—25 |
| 2,589,801 | 3/1952 | Grindrod | 99—25 |
| 3,097,947 | 7/1963 | Kemmerer | 99—25 X |

OTHER REFERENCES

Modern Drug Encyclopedia and Therapeutic Index, 1961, publ. by Donnelley Corp., N.Y., page 751.

Soybean Digest, June 1959, vol. 19, No. 8, pp. 8 and 9.

A. LOUIS MONACELL, *Primary Examiner.*

ABRAHAM H. WINKELSTEIN, *Examiner.*